Oct. 23, 1928.
H. L. ROGERS
1,689,052
NOISE AND VIBRATION REDUCING DEVICE
Filed March 1, 1926
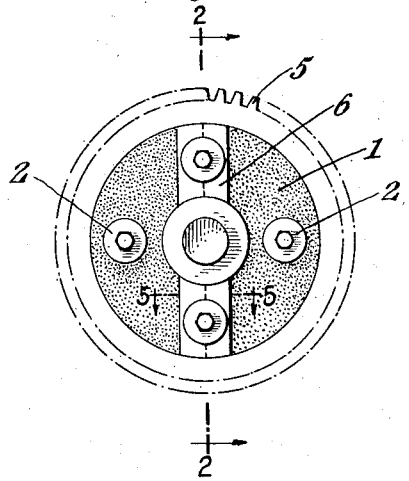
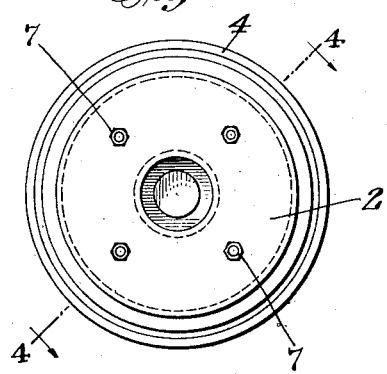
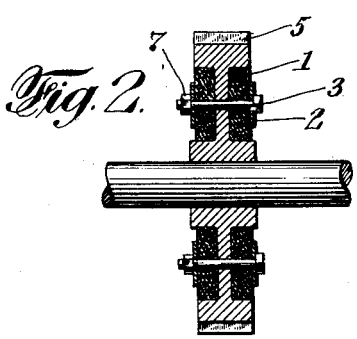
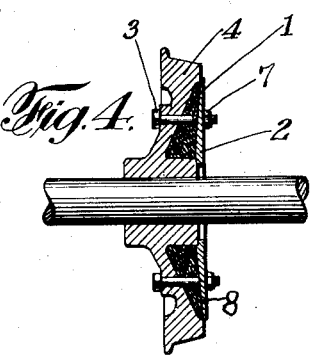
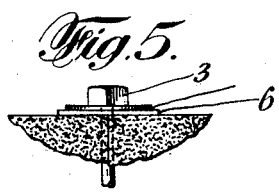
Inventor
Homer L. Rogers
By his Attorney Patented Oct. 23, 1928.

1,689,052

UNITED STATES PATENT OFFICE.

HOMER L. ROGERS, OF CINCINNATI, OHIO, ASSIGNOR TO THE PHILIP CAREY MANUFACTURING COMPANY, A CORPORATION OF OHIO.

NOISE AND VIBRATION REDUCING DEVICE.

Application filed March 1, 1926. Serial No. 91,422.

My invention relates to vibration absorbing and noise reducing devices. It is addressed more especially to devices for reducing noise and absorbing vibration caused by wheels or gears in machinery, wheels on cars and similar objects or other mechanical structures where two members contacting with each other create noise. I have discovered that by attaching to car wheels, gear wheels, sprocket wheels and similar moving metal mechanical devices, a pad preferably of a spongy, or plastic like material in close contact with the wheel, gear, or other mechanical structure that I am able to greatly reduce the noise resulting from the contact of the device, to which I have attached the pad, with adjacent structures. To illustrate my invention I have shown in the drawings my improved pads in two forms. Figures 1 and 2, show my pad attached to a gear wheel and Figures 3 and 4, show my pad attached to a car wheel. Figure 5 is a portion of a cross section on the lines 5, 5 of Figure 1. My pad is preferably formed of a plastic material such as an asphaltic composition with a filler. Any suitable material can be used as a filler but I prefer a composition of rubber and fibrous material. The pad should be moulded to the desired form under pressure sufficient to render it comparatively rigid but not to compact same so that it will be too solid to absorb the vibrations or noise due to contact of the device to which it is attached with another portion of the same mechanism or structure.

It the drawings 1 is my pad which may be made as a unit or in any number of pieces. Suitable holes are provided in the pad, placed so as to be adjacent to like holes placed in the web of the wheel as shown, through which is passed a bolt 3 having a suitable nut 7 on it. Between the head of the bolt and pad or between the nut and the pad is provided a washer 2 adapted to overlap a substantial portion of the pad so as to distribute the pressure thereon and force the pad into close intimate contact with the wheel, gear, or other device to which it is applied. When the pad is made in two pieces as shown in the drawings I prefer to provide a plate 6 which overlaps the two adjacent pieces so that the washer 2 preferably a lock washer engages with the plate 6, secures the two pieces of pad into intimate contact with the device to which they are applied throughout the length of the line at which they are joined and for some distance back of the joint on each side thereof. While I have shown the plate 2 in Figures 3 and 4 of a size to serve as a cover for the pad and completely enclose the pad between the body of the device to which it is attached and the plate 2 thereby serving to protect the pad and hold it more firmly in position, it may be made smaller as shown in Figure 2.

The pad if made of a plastic bituminous material can be coated with a surfacing 8 of protective material preferably an oil resisting material such as collodion or a collodion varnish or similar material to prevent any lubricating oils used in the mechanism from effecting the bituminous material or from softening the pad. I have shown such a surfacing in Fig. 4.

In the manufacture of my pad I prefer to mix asphalt preferably of a melting point sufficiently high to resist the heat generated in the mechanism to which the pad is to be applied, and a suitable filler of rubber and fibers of cotton in proportions that when the material is formed to desired shape, preferably under pressure the pad will be sufficiently rigid and dense to maintain its form without affecting its vibration absorbing or deadening qualities as may be the case if a too dense or solid pad is formed. This depends upon the materials to be used as a binder and as a filler and can be readily determined by simple tests. I have found a satisfactory pad can be formed by combining about 70% by weight of Mexican asphalt with 30% filler composed of rubber and fibers of cotton.

If desired, before the application of the pad, the pad or device to which it is attached could be coated with an adhesive such as asphalt or other suitable material to cement the pad and the device to which it is attached together. For some purposes where it is desired to lock the nut against rotation the washer 2 may be dispensed with and the nut screwed down so as to embed it in the plastic pad 1 which will lock it against rotation. If desired my pad may be applied as a unit or separate independent pads may be applied in contact with each other as shown in Fig. 1 or they may be applied at separate places on the device so as not to contact with each other.

Claims—

1. A noise reducing pad composed of an asphaltic rubber and fibrous composition having a major proportion of asphaltic material preformed to fit the contour of a portion of a movable mechanical device and means for holding said pad in close contact with said device.

2. In a car wheel a noise deadening device consisting of a pad formed to fit the contour of the web of the wheel and means for fixedly holding said pad in close contact with the web, said pad composed of suitable material containing a major proportion of bitumen and a minor proportion of rubber and fibrous material premoulded to fit the contour of said web.

3. A noise reducing pad composed of a body of suitable material and a bituminous binder preformed to correspond with the form and size of the device to which it is to be attached and adapted to be attached to moving mechanical devices to reduce the noise caused by contact with adjacent structures, and a suitable oil resisting means coated on the surface of said pad.

4. A noise reducing pad composed of a body of rubber and fibrous materials and a major proportion of a bituminous binder preformed to correspond with the form and size of the device to which it is to be attached and adapted to be attached to moving mechanical devices to reduce the noise caused by contact with adjacent structures said binder having a melting point sufficiently high to resist the heat generated by the device to which the pad is applied.

5. A noise reducing pad composed in part of a major proportion of bituminous material adapted to be attached to moving mechanical devices to reduce the noise caused by contact with adjacent structures, and a collodion surface on said pad.

6. A noise reducing pad composed in part of a major proportion of bituminous material and a minor proportion of suitable fibrous filler forming a vibration absorbing material adapted to be attached to moving mechanical devices to reduce the noise caused by contact with adjacent structures, and an oil resisting surfacing on said pad.

7. A vibration absorbing pad composed of a major proportion of bituminous, and a minor proportion of rubber and fibrous materials, moulded under pressure to desired form.

8. A noise reducing pad composed of a spongy plastic mass composed of a major proportion of bituminous and a minor proportion of rubber and fibrous materials adapted to be attached to moving mechanical devices to reduce the noise caused by contact with adjacent structures.

In testimony whereof, I have signed my name to this specification.

HOMER L. ROGERS.